United States Patent
Zheng

(10) Patent No.: US 11,799,961 B2
(45) Date of Patent: Oct. 24, 2023

(54) FILE DIRECTORY TRAVERSAL METHOD, APPARATUS, DEVICE, AND MEDIUM

(71) Applicant: BEIJING BAIDU NETCOM SCIENCE AND TECHNOLOGY CO., LTD., Beijing (CN)

(72) Inventor: Pengfei Zheng, Beijing (CN)

(73) Assignee: Beijing Baidu Netcom Science and Technology Co., Ltd., Beijing (CN)

(*) Notice: Subject to any disclaimer, the term of this patent is extended or adjusted under 35 U.S.C. 154(b) by 72 days.

(21) Appl. No.: 17/209,743

(22) Filed: Mar. 23, 2021

(65) Prior Publication Data
US 2021/0211499 A1 Jul. 8, 2021

(30) Foreign Application Priority Data

Jun. 12, 2020 (CN) .......................... 202010538085.4

(51) Int. Cl.
*G06F 16/14* (2019.01)
*H04L 67/1097* (2022.01)
(Continued)

(52) U.S. Cl.
CPC ........ *H04L 67/1097* (2013.01); *G06F 16/148* (2019.01); *H04L 67/06* (2013.01); *H04L 67/5681* (2022.05)

(58) Field of Classification Search
CPC ...... G06F 16/16; G06F 16/168; G06F 16/148; G06F 16/1824
See application file for complete search history.

(56) References Cited

U.S. PATENT DOCUMENTS 6,178,457 B1* 1/2001 Pitchford .................. G06F 8/20
709/227
7,437,438 B2* 10/2008 Mogul ................ G06F 16/9574
707/E17.12
(Continued)

FOREIGN PATENT DOCUMENTS

CN 101344881 A 1/2009
CN 108021472 A 5/2018
(Continued)

OTHER PUBLICATIONS

Extended European Search Report dated Aug. 9, 2021 (9 pages).
(Continued)

*Primary Examiner* — Marc S Somers
(74) *Attorney, Agent, or Firm* — Banner & Witcoff, Ltd.

(57) ABSTRACT

Embodiments of the present application disclose a file directory traversal method, apparatus, device, and medium, and relate to the field of file system processing technology and cloud computing. The method may include: receiving a current directory traversal request of a terminal for a target directory; determining a directory calling identifier of the terminal by parsing the current directory traversal request; wherein, the directory calling identifier is used for uniquely representing the terminal under the target directory; determining a directory entry currently requested to be called by the terminal under the target directory, according to the current directory traversal request; and sending the determined directory entry to the terminal in accordance with the directory calling identifier.

17 Claims, 6 Drawing Sheets

(51) Int. Cl.
*H04L 67/06* (2022.01)
*H04L 67/5681* (2022.01)

(56) References Cited

U.S. PATENT DOCUMENTS

| | | | |
|---|---|---|---|
| 8,671,086 B2 | 3/2014 | Rajic | |
| 9,460,179 B1* | 10/2016 | Gunaratne | G06F 16/168 |
| 2003/0101213 A1* | 5/2003 | Wright | H04L 67/561 |
| | | | 709/203 |
| 2003/0126232 A1 | 7/2003 | Mogul et al. | |
| 2004/0205263 A1* | 10/2004 | Sivaraman | H04L 9/12 |
| | | | 710/21 |
| 2005/0114381 A1* | 5/2005 | Borthakur | G06F 16/10 |
| | | | 707/999.102 |
| 2006/0080353 A1 | 4/2006 | Miloushev et al. | |
| 2008/0027946 A1 | 1/2008 | Fitzgerald | |
| 2008/0162511 A1 | 7/2008 | Theobald | |
| 2009/0187578 A1* | 7/2009 | Morita | G06F 16/4387 |
| 2010/0132024 A1* | 5/2010 | Ben-Natan | G06F 9/545 |
| | | | 709/224 |
| 2010/0198783 A1* | 8/2010 | Wang | G06F 16/275 |
| | | | 707/610 |
| 2011/0145307 A1 | 6/2011 | Ananthanarayanan et al. | |
| 2012/0226872 A1 | 9/2012 | Rajic | |

FOREIGN PATENT DOCUMENTS

| | | |
|---|---|---|
| CN | 109947719 A | 6/2019 |
| CN | 110765094 A | 2/2020 |
| CN | 110928498 A | 3/2020 |
| JP | 2007515002 A | 6/2007 |
| JP | 2009175808 A | 8/2009 |
| KR | 20050031466 A | 4/2005 |

OTHER PUBLICATIONS

Japanese Patent Office, Notice of Reasons for Refusal, Japanese Patent Application No. 2021-089692, dated Jul. 19, 2022, 8 pages.
May 31, 2023—(KR) First Office Action—App. No. 10-2021-0038375 w/ translation, pp. 1-17.

* cited by examiner

FILE DIRECTORY TRAVERSAL METHOD, APPARATUS, DEVICE, AND MEDIUM

CROSS-REFERENCE TO RELATED APPLICATION

This application claims priority to Chinese patent application No. 202010538085.4, filed on Jun. 12, 2020, which is hereby incorporated by reference in its entirety.

TECHNICAL FIELD

Embodiments of the present application relate to computer technology, specifically to the fields of file system processing technology and cloud computing, in particular to a file directory traversal method, apparatus, device, and medium.

BACKGROUND

In a network file system (NFS) protocol, a directory traversal operation needs to be implemented cooperatively between a terminal and a server. The directory traversal operation is a high frequency and important operation in both stand-alone file systems and distributed file systems. Therefore, the directory traversal performance is an important concern in file systems.

SUMMARY

The embodiments of the present application provide a file directory traversal method, apparatus, device, and medium, to optimize the directory traversal performance in a file system.

According to one aspect of the embodiments of the present application, a file directory traversal method is provided, which may include:
  receiving a current directory traversal request of a terminal for a target directory;
  determining a directory calling identifier of the terminal by parsing the current directory traversal request; wherein the directory calling identifier is used for uniquely representing the terminal under the target directory;
  determining a directory entry currently requested to be called by the terminal under the target directory, according to the current directory traversal request; and
  sending the determined directory entry to the terminal in accordance with the directory calling identifier.

According to another aspect of the embodiments of the present application, a file directory traversal apparatus is provided, which may include:
  a current request receiving module configured for receiving a current directory traversal request of a terminal for a target directory;
  a directory calling identifier determining module configured for determining a directory calling identifier of the terminal by parsing the current directory traversal request; wherein, the directory calling identifier is used for uniquely representing the terminal under the target directory;
  a directory entry determining module configured for determining a directory entry currently requested to be called by the terminal under the target directory, according to the current directory traversal request; and
  a directory entry sending module configured for sending the determined directory entry to the terminal in accordance with the directory calling identifier.

According to another aspect of the embodiments of the present application, an electronic device is provided, which may include:
  at least one processor; and
  a memory communicatively connected to the at least one processor; wherein,
  the memory stores instructions executable by the at least one processor, the instructions being executed by the at least one processor to enable the at least one processor to execute the file directory traversal method of any one of the embodiments of the present application.

According to another aspect of the embodiments of the present application, there is provided a non-transitory computer-readable storage medium storing computer instructions, wherein the computer instructions cause a computer to execute the file directory traversal method of any one of the embodiments of the present application.

It is to be understood that the contents in this section are not intended to identify the key or critical features of the embodiments of the present application, and are not intended to limit the scope of the present application. Other features of the present application will become readily apparent from the following description.

BRIEF DESCRIPTION OF THE DRAWINGS

The drawings are included to provide a better understanding of the present application and are not to be construed as limiting the application. Wherein.

DETAILED DESCRIPTION

The exemplary embodiments of the present application are described below in combination with the accompanying drawings, which include various details of the embodiments of the present application to facilitate understanding, and should be considered as merely exemplary. Accordingly, a person skilled in the art should appreciate that various changes and modifications can be made to the embodiments described herein without departing from the scope and spirit of the present application. Also, descriptions of well-known functions and structures are omitted from the following description for clarity and conciseness.

At present, common directory traversal implementations include: a directory traversal solution based on a snapshot technology, a directory traversal solution based on a directory offset, a solution for realizing directory traversal based on a mapping relationship between a cookie value required in a file system protocol and a directory entry name, and the like. However, directory traversal performances realized by these solutions are not ideal due to the limitation of adopted technical means.

Directory entries under any directory in a file system are usually arranged in sequence, and for any directory entry, the result of sorting according to the name of the directory entry thereof or other characteristic information capable of uniquely identifying the directory entry should be stable, i.e., the applicable conditions of the method according to the embodiment of the present application can include at least one of: the calling accuracy of the directory entry and the successful execution of the traversal operation in the directory traversal process can be ensured. Specifically, applicable conditions of the solution may include:

1) in a case where no directory entry modification operation occurs under any directory of a file system in a directory traversal process, relative sorting between respective directory entries under any directory remains unchanged; and
2) in a case where a directory entry modification operation occurs under any directory of the file system in a directory traversal process, such as the insertion of a new directory entry or deletion of an old directory entry, etc., the relative sorting between directory entries in a directory area that does not involve a modification operation remains unchanged.

Figure 1:
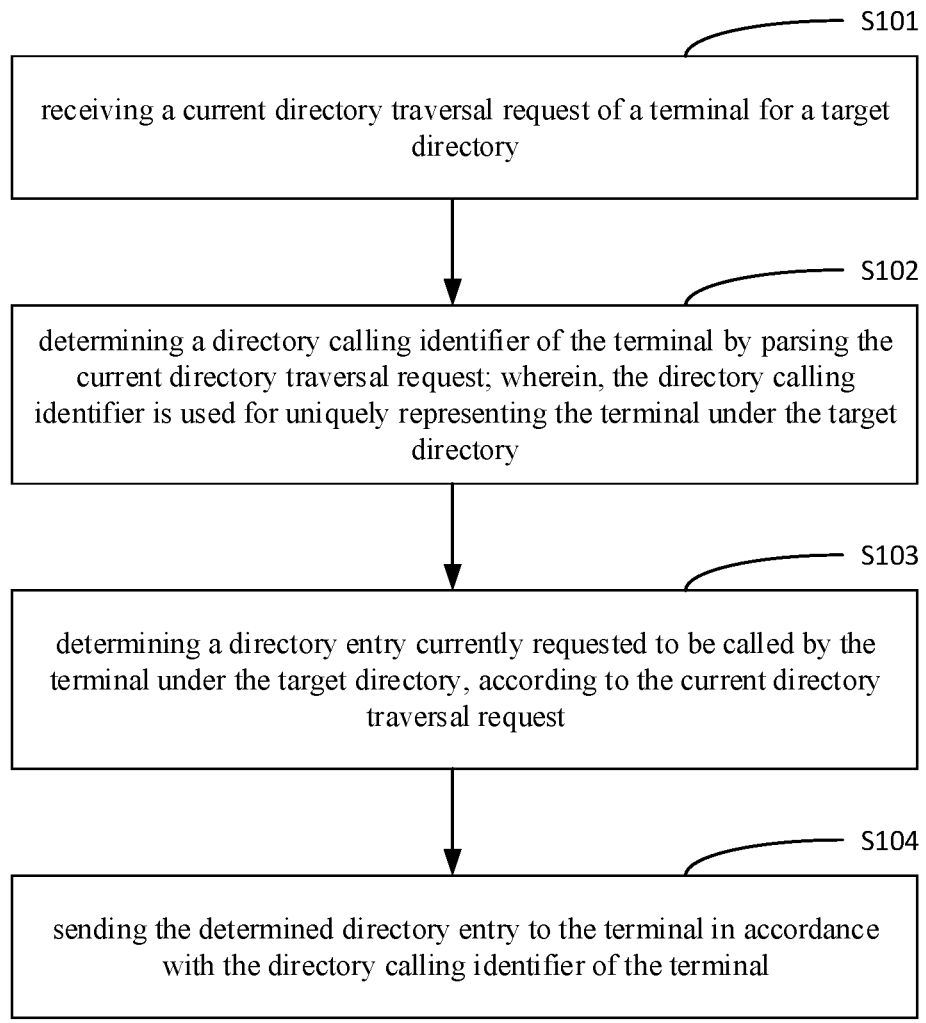
FIG. 1 is a flowchart of a file directory traversal method according to an embodiment of the present application.

FIG. 1 is a flowchart of a file directory traversal method according to an embodiment of the present application, which can be applied in a file system in the case of how to process a directory traversal request of a terminal. Moreover, the embodiment of the present application can be suitable for directory traversal implementation in a stand-alone file system, and can also be suitable for directory traversal implementation in a distributed file system. The method according to the embodiment of the present application may be executed by a file directory traversal apparatus, which may be implemented in software and/or hardware, and may be integrated on any electronic device having a computing capability, such as a server supporting a network file system, etc. In the distributed file system, the electronic device used for executing the technical solution of the embodiment of the present application may be one node. The embodiments of the present application will be described exemplarily below by taking a server as an example, but should not be construed as specifically limiting the execution subject of the technical solution of the embodiments of the present application.

As shown in FIG. 1, a file directory traversal method according to the embodiment of the present application may include:

S101, receiving a current directory traversal request of a terminal for a target directory;

S102, determining a directory calling identifier of the terminal by parsing the current directory traversal request; wherein, the directory calling identifier is used for uniquely representing the terminal under the target directory.

Specifically, a user can use a terminal installed with a file system application program (i.e., a software client), such as a mobile terminal or a tablet computer and the like, to trigger a directory traversal request for the target directory according to the current directory traversal requirement, and send the directory traversal request to a server; the server receives the current directory traversal request of the terminal, and determines a directory calling identifier of the terminal by parsing the current directory traversal request, i.e., the terminal would carry the directory calling identifier in the request and send the same to the server in the process of sending the current directory traversal request, so that the server can distinguish different terminals one by one after receiving a plurality of directory traversal requests.

The directory calling identifier of the terminal is used for uniquely representing the terminal under the target directory. For example, in a case where currently N terminals have traversal requirements for a target directory A in a file system, the server would allocate a unique directory calling identifier for each terminal with respect to the target directory A, to distinguish the terminals. The directory calling identifier may be sent by the server to the terminal in advance during a valid calling of the terminal to the target directory in the file system. The target directory may be any directory in the file system.

S103, determining a directory entry currently requested to be called by the terminal under the target directory, according to the current directory traversal request.

The current directory traversal request sent by the terminal not only may include the directory calling identifier of the terminal, but also may include directory entry information currently requested to be called, such as the target directory corresponding to the directory entry, the name of the directory entry, the identifier of the directory entry, the number of the directory entries requested to be called and the like. Therefore, the server can determine, from the target directory of the file system, the directory entry meeting the current calling requirement of the terminal, according to the current directory traversal request.

S104, sending the determined directory entry to the terminal in accordance with the directory calling identifier of the terminal.

After the server determines the directory entry requested to be called by each terminal, the server can differentially feed the corresponding directory entry back to each terminal in accordance with the directory calling identifier, thereby realizing differentiated maintenance and management of the called directory entries of different terminals. After the traversal of each terminal to the target directory is finished, the server can delete storage data about the terminal in the directory traversal process at any time, for example, a calling mapping relationship between the directory calling identifier stored in the local or internal memory of the server and the called directory entry, so that the occupation of the storage space resource of the server is released, and the calling of other terminals to directory entries under the same directory will not be influenced. That the data related to the calling can be deleted after the traversal is finished, mentioned in the embodiment of the present application, means that after a process of calling a directory entry under the target directory within a specific valid period according to the traversal requirement for the target directory by the terminal is terminated, the server may delete data related to the calling. For example, in a case where a target directory is relatively large directory data, the terminal may need to send multiple times of directory traversal requests to the server such that the traversal process for the target directory is finished. After the calling is finished, the server can delete the data related to the calling of the terminal, to release storage resource.

According to the technical solution of the embodiment of the present application, firstly, the distinguishing of directory traversal requests for different terminals under the same directory is realized by receiving the current directory traversal request of the terminal and determining the directory calling identifier of the terminal; then directory entries meeting the current request of the terminal are sent to the terminal according to the directory calling identifier of the terminal, so that differentiated maintenance and management of the called directory entries of different terminals are realized, and thus the effect of optimizing the directory traversal performance in a file system is achieved.

According to the technical solution of the embodiment of the present application, firstly, the distinguishing of directory traversal requests for different terminals under the same directory is realized by receiving the current directory traversal request of the terminal and determining the directory calling identifier of the terminal; then directory entries meeting the current request of the terminal are sent to the terminal according to the directory calling identifier of the terminal, so that differentiated maintenance and management of the called directory entries of different terminals are realized, the fine-grained management of directory entry callings for different terminals under the same directory is realized, and thus the effect of optimizing the directory traversal performance in a file system is achieved, thereby solving the problem that in existing solutions, since a server does not distinguish traversal requests of terminals for the same directory, in the process of processing the directory traversal requirements of different terminals, the directory calling data required to be maintained is complex in structure, and the directory traversal performance supportable by the server is poor.

Figure 2:
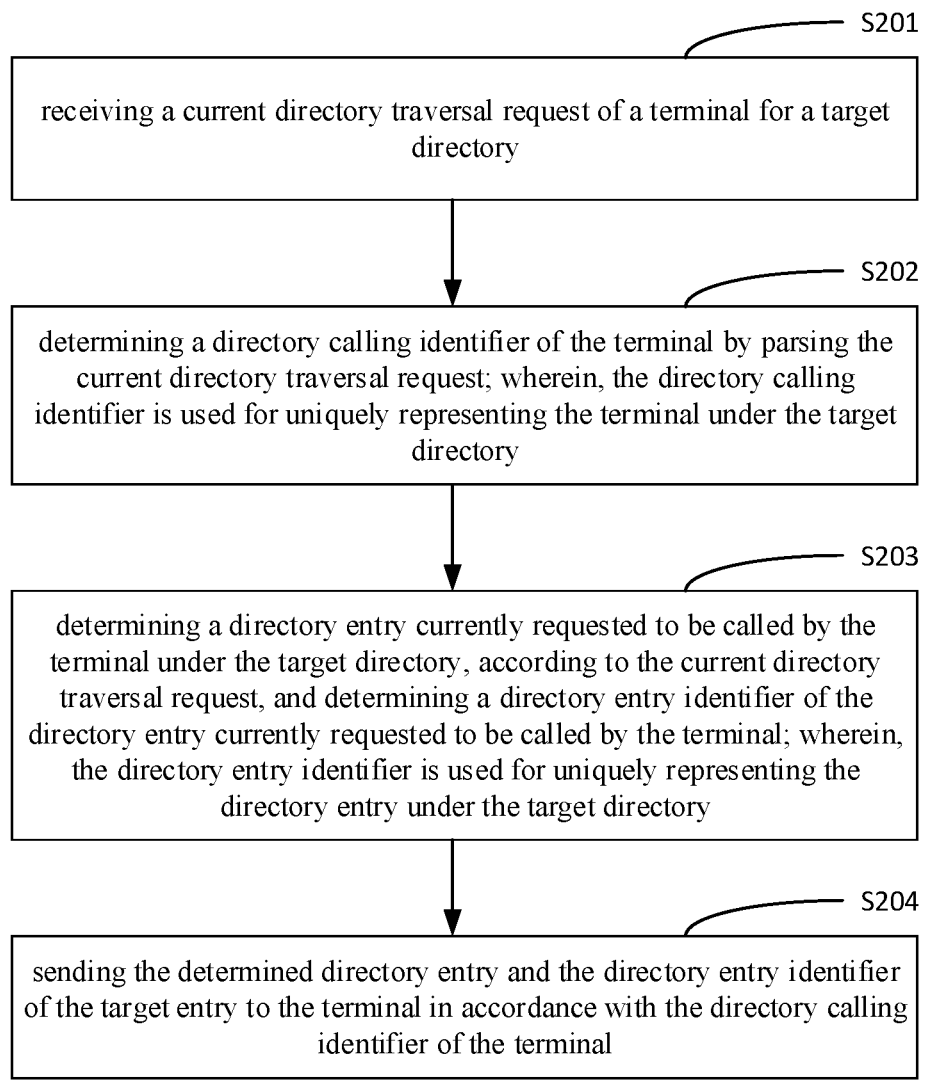
FIG. 2 is a flowchart of another file directory traversal method according to an embodiment of the present application.

FIG. 2 is a flowchart of another file directory traversal method according to an embodiment of the present application. The method is further optimized and extended based on the above-mentioned technical solution, and may be combined with various alternative embodiments mentioned above. As shown in FIG. 2, the method may include:

S201, receiving a current directory traversal request of a terminal for a target directory.

S202, determining a directory calling identifier of the terminal by parsing the current directory traversal request; wherein, the directory calling identifier is used for uniquely representing the terminal under the target directory.

S203, determining a directory entry currently requested to be called by the terminal under the target directory, according to the current directory traversal request, and determining a directory entry identifier of the directory entry currently requested to be called by the terminal; wherein, the directory entry identifier is used for uniquely representing the directory entry under the target directory.

S204, sending the determined directory entry and the directory entry identifier of the target entry to the terminal in accordance with the directory calling identifier of the terminal.

In the embodiment of the present application, for each directory, a directory entry identifier may be allocated to each directory entry belonging to the directory in advance, for uniquely representing the directory entry under the directory. Therefore, both the directory entry currently requested to be called by the terminal and the directory entry identifier of the directory entry can be determined, and in particular, the determination sequence of the directory entry and the directory entry identifier is not limited in the embodiments of the present application. The determination of the directory entry identifier can facilitate the server to record and locate directory entry information currently requested to be called by each terminal. Illustratively, in the process of each directory traversal, the server may establish a mapping relationship among a directory calling identifier, a directory entry identifier, and a directory entry requested to be called by a terminal for each terminal; after a next directory traversal request of the terminal for a current target directory is received, the directory entry that has been requested by the terminal can be quickly determined according to the historical directory entry identifier having been sent to the terminal, and the directory entry corresponding to the next directory traversal request can also be determined, and then the directory entry is sent to the terminal; that is, a foundation can be laid for efficiently determining the directory entry requested to be called by the terminal, by allocating a directory entry identifier for each directory entry under the target directory, thereby facilitating to optimize the directory traversal performance supported by the server. Meanwhile, for each terminal, a directory entry identifier is allocated to each directory entry under the target directory, and each directory entry is managed and located in accordance with the directory entry identifier. Compared with the situation that terminals are not distinguished and directory entries are managed and located in accordance with the names of the directory entries, less storage space may be utilized in the server to maintain data related to a directory calling.

Moreover, for a terminal, a directory entry identifier is received while a directory entry is received, so that the terminal can be facilitated to conveniently record the directory entry having been currently requested to be called.

In addition, since the embodiment of the present application realizes the fine-grained management of directory entry callings by distinguishing directory traversal requests of different terminals under the same directory, compared with the situation that traversal requests of a plurality of terminals for the same directory are not managed differently, directory calling data with a complex structure for a plurality of terminals at the same time does not need to be maintained, that is, the data structure required to be maintained by a server in the directory traversal process is simplified through the fine-grained management of the directory entry callings, more storage space resources are not required to be consumed to store complex directory calling data, and meanwhile, the directory calling data for different terminals can be deleted at any time after the complete calling is finished, so that the occupation of storage space resources of the server is released.

According to the technical solution of the embodiment of the present application, firstly, the distinguishing of directory traversal requests for different terminals under the same directory is realized by receiving the current directory traversal request of the terminal and determining the directory calling identifier of the terminal; then the directory entry currently requested to be called by the terminal and the directory entry identifier of the directory entry are determined, and the determined directory entry and the directory entry identifier are sending to the terminal together, so that differentiated maintenance and management of the called directory entries of different terminals are realized, the fine-grained management of directory entry callings for different terminals under the same directory is realized, and thus the effect of optimizing the directory traversal performance in a file system is achieved, thereby solving the problem that in existing solutions, since a server does not distinguish traversal requests of terminals for the same directory, in the process of processing the directory traversal requirements of different terminals, the directory calling data required to be maintained is complex in structure, and the directory traversal performance supportable by the server is poor. Meanwhile, the determination of the directory entry identifier not only facilitates a server to conveniently locate the directory entry requested to be called by a terminal, but also facilitates the terminal to conveniently record the requested directory entry.

On the basis of the above-mentioned technical solution, optionally, the sending the determined directory entry and the directory entry identifier of the target entry to the terminal in accordance with the directory calling identifier of the terminal, may include:

generating a calling mark value of the directory entry according to the directory calling identifier and the directory entry identifier of the target entry; wherein, a data format of the calling mark value is related to a file system protocol; and sending the determined directory entry and the calling mark value of the target entry to the terminal.

That is, for different file system protocols, the calling mark value may adopt different data formats, and the embodiments of the present application are not specifically limited, for example, for the currently common network file system (NFS) protocol, the calling mark value may refer to a cookie value. The number of generated calling mark values is the same as the number of directory entries currently requested to be called by a terminal, that is, the same as the number of determined directory entry identifiers. The directory calling identifier and the directory entry identifier may respectively be data occupying a preset bit number, and the value of the specific bit number about the directory calling identifier and the directory entry identifier may be adaptively set.

Taking the calling mark value being a cookie value as an example, the cookie value may be data of 64 bits under binary counting, and in a case where the directory calling identifier of the terminal is preset as data of N bits, the directory entry identifier of the directory entry is data of (64−N) bits. After the value of N is determined, the number of directory entries under a single directory cannot exceed $2^{(64-N)}$, and the number of concurrent directory traversal requests supported by a single server does not exceed $2^N$, that is, the number of directory calling identifiers under the same directory supported by a single server does not exceed $2^N$. For example, in a case where N has a value of 16, the number of concurrent directory traversal requests supported by a single server is at most $2^{16}$ (i.e., 65535), and the number of directory entries under a single directory is at most $2^{48}$ (i.e., 281474976710655), and these numbers have values far exceeding the maximum number of directory entries that can be supported by existing file systems of various types. Thus, an appropriate N value can ensure that the solution of the embodiment of the present application is widely applied to any file system.

Assuming that the directory calling identifier is represented using SlotID and the directory entry identifier is represented using SequenceID, the data structure composition of one cookie value may be represented as follows:

| SlotID | SequenceID |
| --- | --- |

Further, considering the storage space limitation of the terminal, such as limited internal storage, directory entries which a server sends to a terminal in each directory traversal process are not necessarily all received by the terminal, and the phenomenon that part of the directory entries are discarded may exist. For example, in the current directory traversal process, the terminal requests 20 directory entries from the server, and the server may finally send 20 directory entries to the terminal. In a case where the storage space of the terminal is not sufficient, the number of successfully received directory entries by the terminal is less than 20, for example, the number of successfully received directory entries by the terminal may be 15. Therefore, in order to ensure the integrity of the directory entries requested by the terminal, the server needs to send the directory entries which are not successfully received by the terminal to the terminal again in the next directory traversal process of the terminal.

Therefore, in the embodiment of the present application, the directory entry identifier of the directory entry is further used for the terminal to mark the directory entry successfully received in the current directory traversal process. In the next directory traversal process for the same directory, the terminal may carry the directory entry identifier of the successfully received directory entry in the directory traversal request, so that the server can accurately judge the directory entry successfully received by the terminal as well as which directory entries need to be sent to the terminal in the next calling process. In general, the directory entries are stored and called in sequence, the terminal records the directory entry identifiers of the successfully received directory entries and records the same in sequence, and the last successfully received directory entry identifier is recorded at last. Therefore, the current directory traversal request of the terminal may include the historical directory entry identifier of the last directory entry which has been received successfully by the terminal in the previous directory traversal process for the current target directory, thereby enabling the server to accurately locate the first directory entry requested by the terminal in the current directory traversal process; in other words, the terminal may include, in the next directory traversal request for the current target directory, the directory entry identifier of the last directory entry which has been received successfully by the terminal in the current calling process, thereby enabling the server to accurately locate the first directory entry requested by the terminal in the next directory traversal process.

Figure 3:
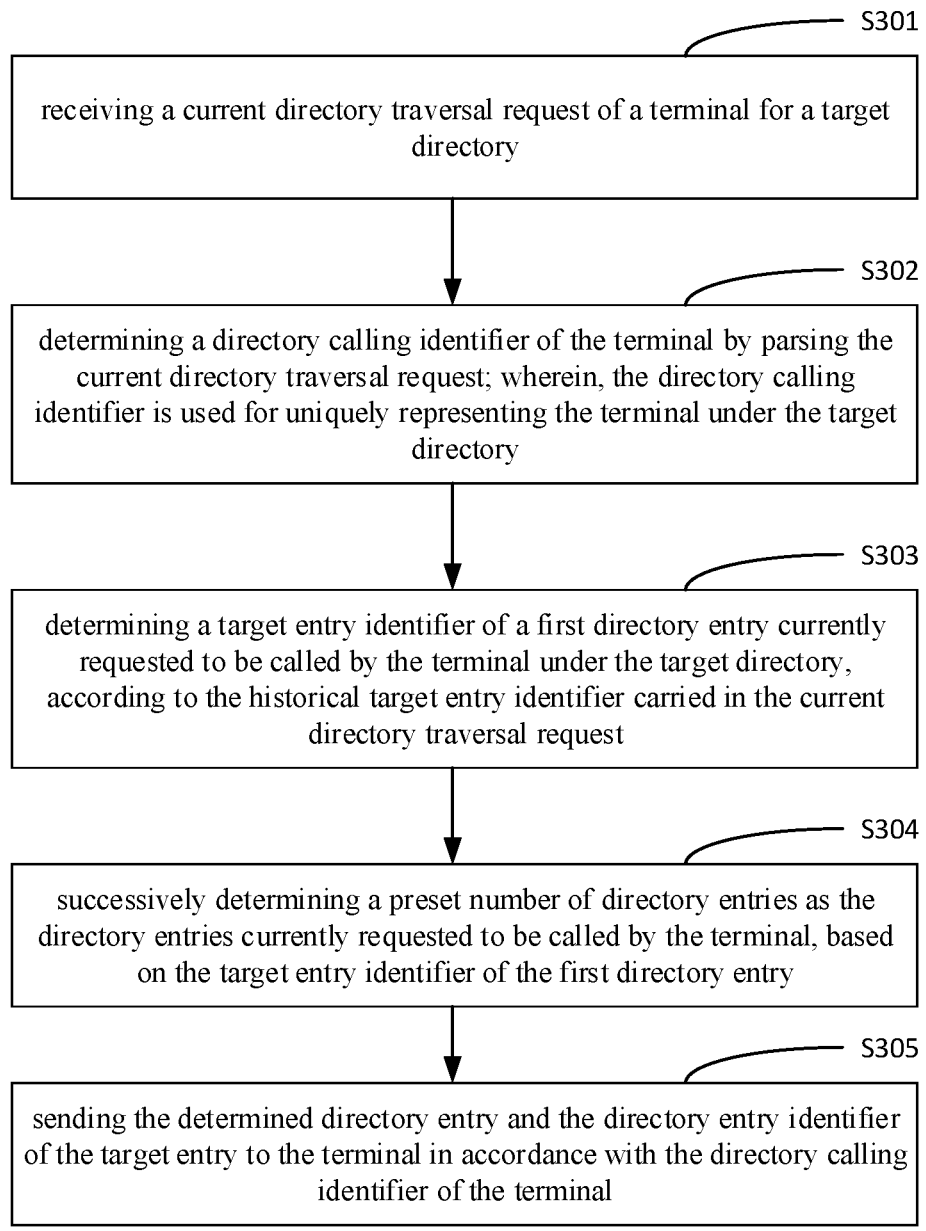
FIG. 3 is a flowchart of another file directory traversal method according to an embodiment of the present application.

Based on the above-mentioned technical solution, FIG. 3 is a flowchart of another file directory traversal method according to an embodiment of the present application, which may be combined with the above-mentioned respective alternative embodiments. And, specifically taking the sequential calling of directory entries and determining the directory entries currently requested to be called by the terminal according to the directory entry identifier as examples, the embodiment of the present application is exemplarily illustrated. As shown in FIG. 3, the method may include:

S301, receiving a current directory traversal request of a terminal for a target directory.

S302, determining a directory calling identifier of the terminal by parsing the current directory traversal request; wherein, the directory calling identifier is used for uniquely representing the terminal under the target directory.

S303, determining a target entry identifier of a first directory entry currently requested to be called by the terminal under the target directory, according to the historical target entry identifier carried in the current directory traversal request.

Herein, the historical target entry identifier carried in the current directory traversal request refers to the directory entry identifier of the last directory entry which has been received successfully by the terminal in the previous directory traversal process for the current target directory. The server may take the next target entry identifier corresponding to this historical target entry identifier as the directory entry identifier of the first directory entry currently requested to be called, in accordance with the sequence of the directory entries under the current target directory.

S304, successively determining a preset number of directory entries as the directory entries currently requested to be called by the terminal, based on the target entry identifier of the first directory entry.

Herein, the value of the preset number may be determined according to the current directory traversal request of the terminal. In the process of determining the directory entry currently requested to be called by the terminal based on the target entry identifier of the first directory entry, the directory entry identifier of the directory entry requested to be called by the terminal is also determined accordingly.

S305, sending the determined directory entry and the directory entry identifier of the target entry to the terminal in accordance with the directory calling identifier of the terminal.

According to the technical solution of the embodiment of the present application, firstly, the distinguishing of directory traversal requests for different terminals under the same directory is realized by receiving the current directory traversal request of the terminal and determining the directory calling identifier of the terminal; then, the directory entry currently requested to be called by the terminal and the directory entry identifier are determined according to the historical target entry identifier carried in the current directory traversal request, so that the efficient and accurate determination of the directory entry requested by the terminal is realized, the fine-grained management of the directory entry callings for different terminals under the same directory is realized, and thus the effect of optimizing the directory traversal performance in a file system is achieved.

In addition, compared with the directory traversal solution based on the snapshot technology among the existing solutions, the embodiments of the present application are completely unrelated to the complex snapshot technology, so that the directory traversal operation of the terminal is more convenient and fast to implement, while the maintenance cost of the server for the technical implementation can also be reduced. Compared with the directory traversal solution based on a directory offset among the existing solutions, the embodiments of the present application do not need to search a directory entry according to an offset, and do not need to focus on the update of the directory offset even if a file is added or deleted in a file system, so that the overhead of accurately maintaining structural data such as the directory offset and the like can be reduced, and also it can avoid the problem of repeated calling of directory entries or missing calling of directory entries due to the fact that the directory offset is not updated in time and the subsequent directory entries are still determined by the old directory offset in a case where file items change, such as adding or deleting a file. Compared with the solution for realizing directory traversal based on a mapping relationship between a cookie value required in a file system protocol and a directory entry name among the existing solutions, the embodiments of the present application maintain the mapping relationship between the directory entry identifier and the directory entry respectively for each kind of terminal by distinguishing traversal requests of different terminals for the same directory, so that data required to be maintained is simple in structure, the occupation of storage resources of the server is less, and after the complete directory traversal operation for each terminal is finished, the directory calling related data for the terminal can be deleted at any time, to release the storage resources of the server.

Figure 4:
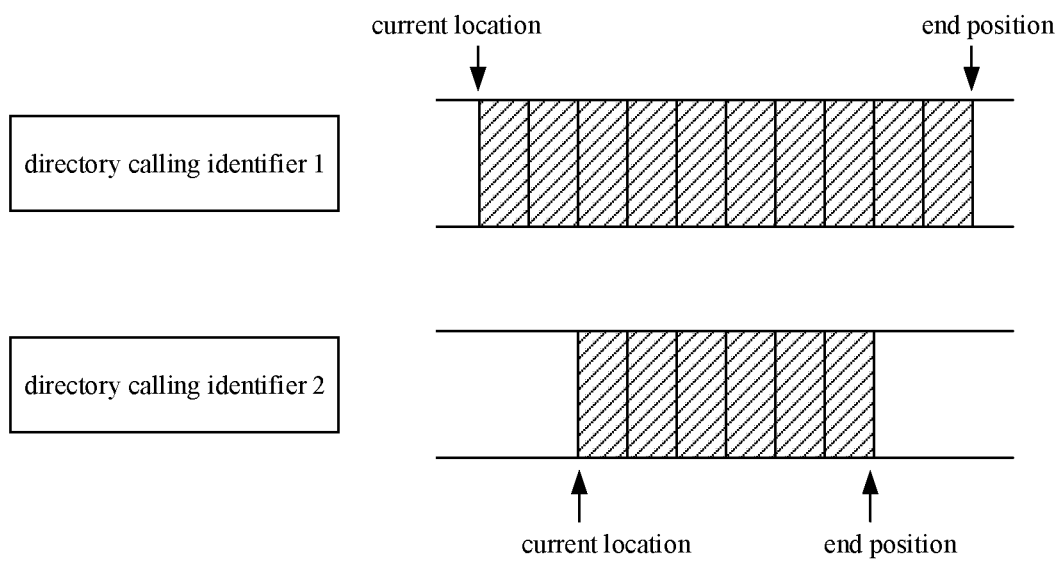
FIG. 4 is a schematic diagram of determining a directory entry requested to be called by a terminal based on a directory entry identifier according to an embodiment of the present application.

FIG. 4 is a schematic diagram of determining a directory entry requested to be called by a terminal based on a directory entry identifier according to an embodiment of the present application. As shown in FIG. 4, in the calling process for a target directory, a directory calling identifier 1 is allocated to a terminal 1, the position of the first directory entry requested to be called by the terminal 1 for the target directory is the current position of the directory entry, and the position of the last directory entry requested to be called is the end position of the directory entry; in the same way, in the current calling process for the target directory, a directory calling identifier 2 is allocated to a terminal 2, the position of the first directory entry requested to be called by the terminal 2 for the target directory is the current position of the directory entry, and the position of the last directory entry requested to be called is the end position of the directory entry.

On the basis of the above-mentioned technical solutions, preferably, before sending the determined directory entry to the terminal according to a directory calling identifier, or before sending the determined directory entry and the directory entry identifier of the target entry to the terminal, a method according to an embodiment of the present application may further include: determining the number of directory entries sent to the terminal in the current directory traversal process according to the storage space information of the terminal, such as the internal storage value of the terminal. That is, for the condition that the storage space limitation exists in the terminal, and directory entries sent by the server cannot be completely received in each directory traversal process, the server can predetermine the number of directory entries which can be successfully received by the terminal according to the storage space information of the terminal, to perform targeted sending of the number of the directory entries, so that repeated sending of directory entries is reduced and the waste of system bandwidth resources is reduced.

Figure 5:
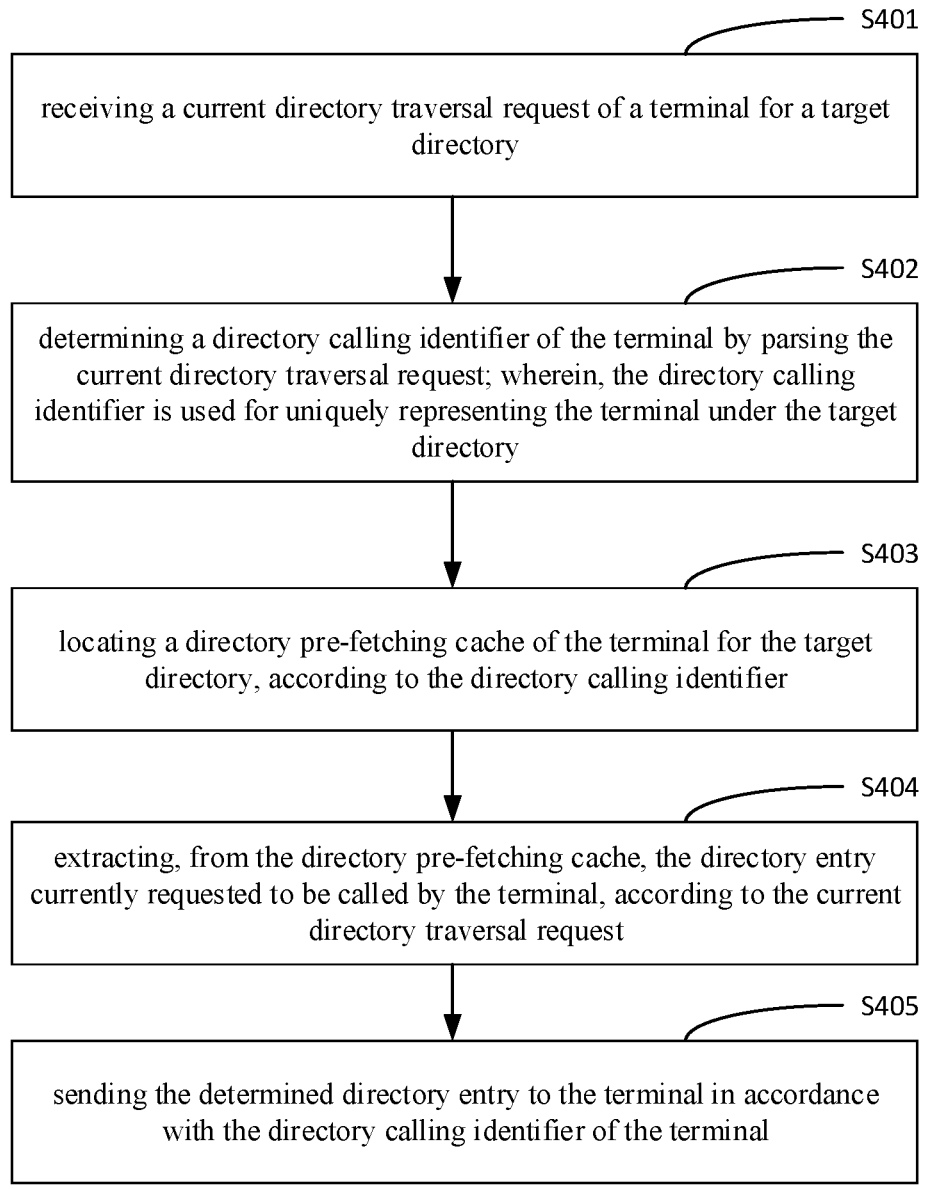
FIG. 5 is a flowchart of another file directory traversal method according to an embodiment of the present application.

FIG. 5 is a flowchart of another file directory traversal method according to an embodiment of the present application. The method is further optimized and extended based on the above-mentioned technical solution, and may be combined with various alternative embodiments mentioned above. As shown in FIG. 5, the method may include:

S401, receiving a current directory traversal request of a terminal for a target directory.

S402, determining a directory calling identifier of the terminal by parsing the current directory traversal request; wherein, the directory calling identifier is used for uniquely representing the terminal under the target directory.

S403, locating a directory pre-fetching cache of the terminal for the target directory, according to the directory calling identifier.

S404, extracting, from the directory pre-fetching cache, the directory entry currently requested to be called by the terminal, according to the current directory traversal request.

S405 sending he determined directory entry to the terminal according to the directory calling identifier of the terminal.

Under any target directory, for different terminals, the embodiments of the present application each can set a directory pre-fetching cache for each terminal. The directory pre-fetching cache is used to store a certain number of directory entries for each terminal in advance for the target directory, or used to predict directory entries that each terminal will request in the next directory traversal process for the target directory. In general, in each directory traversal process, the operation of reading a directory entry from a storage medium or a file system by a server is a time-consuming operation, thus the time delay of reading the directory entry can be effectively reduced through the cache pre-fetching strategy of the directory entry, and the cache area of each terminal can be quickly located by differently setting directory pre-fetching caches, thereby improving the extraction efficiency of the directory entries requested by the terminal.

Illustratively, under the target directory, for the directory pre-fetching cache of each terminal, the pre-fetched directory entry also corresponds to a unique directory entry identifier, and the server can determine the target entry identifier of the first directory entry currently requested to be called by the terminal under the target directory according to the historical target entry identifier carried in the current directory traversal request of the terminal; then, on the basis of the target entry identifier of the first directory entry, directory entries of a preset number are successively determined from the directory pre-fetching cache, as directory entries currently requested to be called by the terminal.

In the directory pre-fetching cache, the opportunity of caching directory entries for each terminal may include:
1) in a case where a server obtains a new directory entry from a file system every time, in addition to obtaining the required directory entry, directory entries of a certain number (the specific value may be adaptively set) can be extracted additionally, and the additionally extracted directory entries are stored in a cache, to be used by subsequent requests;
2) after the number of the directory entries cached in the directory pre-fetching cache is lower than a set threshold (the specific value may be adaptively set), the acquisition operation of directory entries can be initiated in advance before the directory traversal request of the terminal is received, and the acquired directory entries are stored in the cache. After the directory traversal request of the terminal is received, required directory entries can be immediately extracted from the directory pre-fetching cache and returned to the terminal, so that the perceived operation delay by a user can be reduced for the user.

Specifically, in a case where the number of directory entries in the directory pre-fetching cache is insufficient to meet the current traversal requirement of the terminal, the server needs to obtain directory entries from a storage medium or a file system, to meet the current traversal requirement of the terminal. Moreover, in each directory traversal process, directory entries requested by the terminal in the historical directory traversal process in the directory pre-fetching cache can be deleted to release the cache space.

According to the technical solution of the embodiment of the present application, firstly, the distinguishing of directory traversal requests for different terminals under the same directory is realized by receiving the current directory traversal request of the terminal and determining the directory calling identifier of the terminal; then, the directory pre-fetching cache of the terminal for the target directory is rapidly located according to the directory calling identifier, and the directory entry currently requested to be called by the terminal is extracted from the directory pre-fetching cache, so that the extraction efficiency of the directory entry requested by the terminal is improved, the time delay effect in the directory traversal process is reduced, the response efficiency of the directory traversal is improved, and thus the effect of optimizing the directory traversal performance in the file system is achieved.

On the basis of the above-mentioned technical solution, optionally, before the current directory traversal request of the terminal is received, a method according to an embodiment of the present application may further include:
receiving the first directory traversal request of the terminal for a target directory; and
allocating an available directory calling identifier to the terminal, in response to determining that the available directory calling identifier exists under the target directory; wherein, the first directory traversal request carries a set mark. Specifically, the format of the set mark may be determined according to a file system protocol, for example, the set mark may be one special cookie value appointed in advance for representing the first traversal calling of the terminal to the target directory. For the same directory, the number of directory calling identifiers allocable under the directory is limited, and there are no repeated directory calling identifiers allocated to different terminals. Therefore, after receiving the first directory traversal request of a terminal for a target directory, the server needs to determine whether an available directory calling identifier, i.e., a remaining unallocated directory calling identifier, exists currently under the target directory, and if so, a directory calling identifier is allocated; otherwise, a specific error code may be returned to the terminal, to allow the terminal to retry sending the first directory traversal request until an allocable directory calling identifier exists. Of course, the terminal may also terminate the request.

Further, a method according to an embodiment of the present application may further include:
clearing a binding relationship between the terminal and the directory calling identifier, in a case where a receiving moment of the current directory traversal request is taken as a starting time point and a next directory traversal request of the terminal is not received within a preset time.

Specifically, the server may start timing after receiving the current directory traversal request of the terminal; in a case where the next directory traversal request of the terminal is not received within a preset time, the terminal is considered to be inactive currently and data related to directory calling for the terminal can be cleared, such as cached data, a binding relationship between the terminal and a directory calling identifier and the like. An unbound directory calling identifier may be marked as an available state, that is, it may be allocated to other terminals for use. Therefore, the storage space resource of the server can be saved, and the availability of the directory calling identifier under each directory can be improved.

Illustratively, an embodiment of the present application will be described exemplarily below by taking the calling mark value being a cookie value, i.e., the server sends a cookie value corresponding to each directory entry while sending directory entries to the terminal during each directory traversal process of the terminal, but it should not be construed as specifically limiting the embodiment of the present application. The directory traversal process of the terminal is implemented as follows:
1) A terminal initiates a first directory traversal request for a target directory to a server, wherein the request carries an appointed special cookie value for indicating that the request is the first request.

2) After receiving the first directory traversal request of the terminal, the server checks whether an available directory calling identifier SlotID exists under the target directory, if so, the directory calling identifier SlotID is allocated to the terminal; otherwise, a specific error code is returned, to make the terminal to retry the operation 1).
3) The server reads, from a file system, directory entries of a preset number currently required by the terminal. Specifically, directory entries required by the terminal may be extracted from a directory pre-fetching cache of the terminal for a target directory, and the directory entries in the directory pre-fetching cache are directory entries pre-cached for the terminal. Meanwhile, the directory entry identifier SequenceID of the first directory entry currently requested by the terminal and the directory entry identifier SequenceID of the last directory entry currently requested by the terminal may be determined. The cookie value for each directory entry is encoded using the directory entry identifier SequenceID and the directory calling identifier SlotID. The server may send the acquired directory entry and the cookie value corresponding to the directory entry together to the terminal. Of course, data which the server sends to the terminal may also include the attribute information of each directory entry, such as modification time, creation time, access time, name, etc.
4) The terminal receives the data sent by the server, and saves the directory entry, the cookie value, and other directory entry attribute information. The terminal may have internal storage or other restrictions which may cause the terminal to save fewer directory entries than those the server actually returns.
5) The terminal checks whether the saved last directory entry carries an end mark. If so, it indicates that the traversal for the target directory is completed, and the traversal process can be ended; otherwise, the terminal continues to send a next directory traversal request. The next directory traversal request carries the last cookie value currently saved.
6) The server receives the directory traversal request of the terminal again, extracts the directory calling identifier SlotID from the cookie value carried in the request, locates a directory pre-fetching cache corresponding to the terminal, successfully determines the directory entries currently requested by the terminal according to the directory entry identifier SequenceID extracted from the cookie value, and simultaneously can eliminate all directory entry caches before the directory entry identifier SequenceID. Wherein, in a case where the number of the directory entries in the cache does not meet the number of the directory entries currently required by the terminal and the directory is not traversed completely, the server continues to acquire remaining directory entries to be supplemented from the file system in addition to the existing directory entries in the cache. Specifically, directory entries of a sufficient number may be acquired from the file system based on the directory entry identifier SequenceID, the directory entry name, or other locating information that can locate the required directory entry in the file system.
7) The server fills the directory entries acquired from the file system into a directory pre-fetching cache corresponding to the terminal, and each directory entry is still allocated with a directory entry identifier SequenceID while being filled. The directory entry identifier SequenceID of the last directory entry currently requested by the terminal is determined. In a case where the directory traversal is finished so far, the server can mark the position of the last directory entry currently requested by the terminal as the directory traversal end position, and set an end mark.
8) The server returns data such as the directory entry, the cookie value of the directory entry, and the attribute information of the directory entry to the terminal. The terminal detects the end mark from the last saved directory entry and terminates sending a directory traversal request, and the whole directory traversal process ends.

It should be noted that, for the same directory, the way of allocating the directory entry identifier SequenceID and the way of allocating the directory calling identifier SlotID may be adjusted according to actual conditions, and the correctness of the technical solution implementation is not influenced, as long as the following conditions are met:
1) under the same directory, for the directory traversal requests from the same terminal, the SequenceID of each directory entry is unique; and
2) under the same directory, directory calling identifier SlotID values that may be used are not repeated.

According to the technical solution of the embodiment of the application, by distinguishing traversal requests of different terminals for the same directory, the mapping relationship between the cookie value and the directory entry can be established using less storage resources, and the directory traversal operation with high performance and low resource consumption is achieved by combining an appropriate directory entry pre-fetching strategy.

Figure 6:
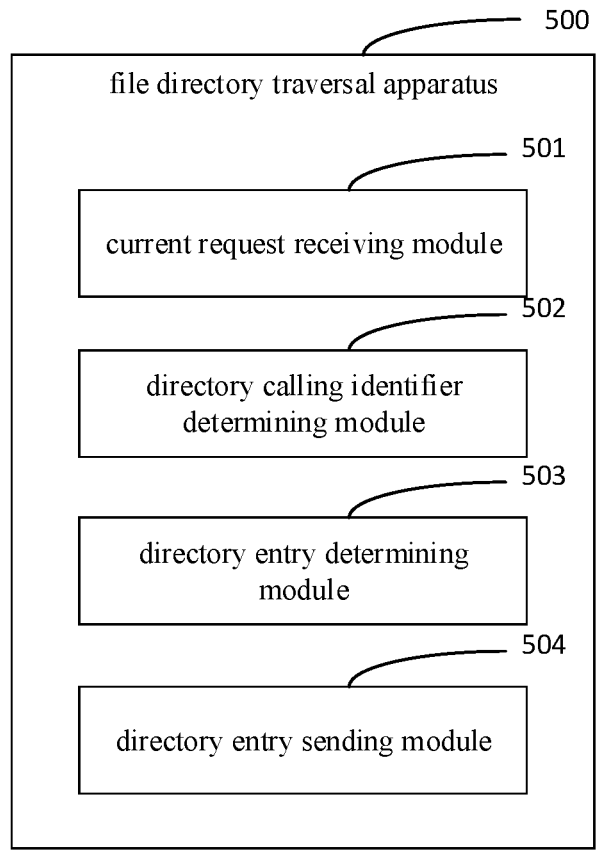
FIG. 6 is a schematic structural diagram of a file directory traversal apparatus according to an embodiment of the present application.

FIG. 6 is a schematic structural diagram of a file directory traversal apparatus according to an embodiment of the present application. The embodiment of the present application may be applied to the case of how to process a directory traversal requirement of a terminal in a file system. The apparatus disclosed in the embodiment of the present application may be implemented by adopting software and/or hardware, and may be integrated on any electronic device having computing capabilities, such as a server supporting a network file system, etc.

As shown in FIG. 6, a file directory traversal apparatus 500 according to an embodiment of the present application may include a current request receiving module 501, a directory calling identifier determining module 502, a directory entry determining module 503, and a directory entry sending module 504, wherein:
the current request receiving module 501 may be configured for receiving a current directory traversal request of a terminal for a target directory;
the directory calling identifier determining module 502 may be configured for determining the directory calling identifier of the terminal by parsing the current directory traversal request; wherein, the directory calling identifier is used for uniquely representing the terminal under the target directory;
the directory entry determining module 503 may be configured for determining a directory entry currently requested to be called by the terminal under the target directory, according to the current directory traversal request; and
the directory entry sending module 504 may be configured for sending the determined directory entry to the terminal in accordance with the directory calling identifier.

Optionally, the directory entry determining module 503 may further be configured for determining a directory entry identifier of the directory entry currently requested to be called by the terminal; wherein, the directory entry identifier is used for uniquely representing the directory entry under the target directory;

The directory entry sending module 504 may be specifically configured for:
sending the determined directory entry and the directory entry identifier of the target entry to the terminal in accordance with the directory calling identifier.

Optionally, the directory entry identifier may be further used for the terminal to mark a directory entry received successfully in a current directory traversal process;
the current directory traversal request may include a historical directory entry identifier of a last directory entry which has been received successfully by the terminal in a previous directory traversal process for the target directory.

Optionally, the directory entry sending module 504 may include:
a calling mark value generating unit configured for generating a calling mark value of the directory entry according to the directory calling identifier and the directory entry identifier of the target entry, wherein, a data format of the calling mark value is related to a file system protocol; and
a directory entry sending unit configured for sending the determined directory entry and the calling mark value of the target entry to the terminal.

Optionally, the directory entry determining module 503 may include:
a first target entry identifier determining unit configured for determining a target entry identifier of a first directory entry currently requested to be called by the terminal under the target directory, according to the historical target entry identifier carried in the current directory traversal request; and
a directory entry determining unit configured for successively determining a preset number of directory entries as the directory entries currently requested to be called by the terminal, based on the target entry identifier of the first directory entry.

Optionally, the directory entry determining module 503 may include:
a pre-fetching cache determining unit configured for locating a directory pre-fetching cache of the terminal for the target directory, according to the directory calling identifier; and
a directory entry extracting unit configured for extracting, from the directory pre-fetching cache, the directory entry currently requested to be called by the terminal, according to the current directory traversal request.

Optionally, the apparatus according to the embodiment of the present application may further include:
an initial request receiving module configured for receiving a first directory traversal request of the terminal for the target directory before the current request receiving module 501 executes an operation of receiving the current directory traversal request of the terminal; and
a directory calling identifier allocating module configured for allocating an available directory calling identifier to the terminal, in response to determining that the available directory calling identifier exists under the target directory; wherein, the first directory traversal request carries a set mark.

Optionally, the apparatus according to the embodiment of the present application may further include:
a sending number determining module configured for determining a number of directory entries sent to the terminal in a current directory traversal process, according to storage space information of the terminal, before the directory entry sending module 504 executes an operation of sending the determined directory entry to the terminal in accordance with the directory calling identifier.

Optionally, the apparatus according to the embodiment of the present application may further include:
a binding relationship clearing module configured for clearing a binding relationship between the terminal and the directory calling identifier, in a case where a receiving moment of the current directory traversal request is taken as a starting time point and a next directory traversal request of the terminal is not received within a preset time.

Optionally, suitable conditions for the operation of the apparatus disclosed in the embodiment of the present application include at least one of:
in a case where no directory entry modification operation occurs under any directory of a file system in a directory traversal process, the relative sorting between respective directory entries under any directory remains unchanged; and
in a case where a directory entry modification operation occurs under any directory of the file system in a directory traversal process, relative sorting between directory entries in the directory area that does not involve a modification operation remains unchanged.

The file directory traversal apparatus 500 according to the embodiment of the present application can execute any file directory traversal method according to the embodiments of the present application, and has corresponding functional modules for executing the method and beneficial effects. For contents that are not described in detail in the apparatus embodiment of the present application, reference may be made to the description in any method embodiment of the present application.

According to an embodiment of the present application, the embodiment of the present application further provides an electronic device and a readable storage medium.

Figure 7:
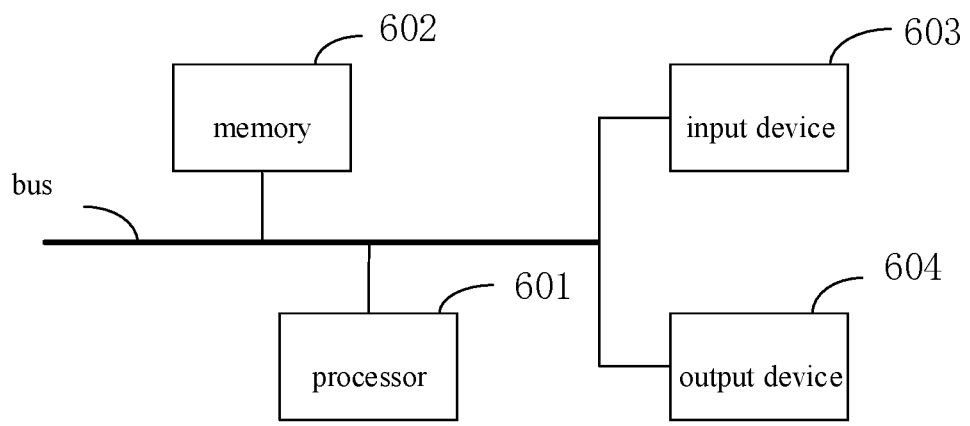
FIG. 7 is a block diagram of an electronic device according to an embodiment of the present application.

FIG. 7 is a block diagram of an electronic device for implementing the file directory traversal method according to an embodiment of the present application. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the embodiment of the application described and/or claimed herein.

As shown in FIG. 7, the electronic device may include one or more processors 601, a memory 602, and interfaces for connecting components, including high-speed interfaces and low-speed interfaces. The respective components are interconnected by different buses and may be mounted on a common main-board or otherwise as desired. The processor may process instructions executed within the electronic device, including instructions stored in or on the memory to display graphical information of a graphical user interface (GUI) on an external input/output device, such as a display device coupled to the interface. In other implementations, a plurality of processors and/or buses may be used with a plurality of memories, if necessary. Also, a plurality of electronic devices may be connected, each providing some of the necessary operations (e.g., as an array of servers, a set of blade servers, or a multiprocessor system). An example of one processor 601 is shown in FIG. 7.

The memory 602 is a non-transitory computer-readable storage medium provided by the embodiment of the present application. The memory stores instructions executable by at least one processor to cause at least one processor to execute the file directory traversal method provided by the embodiment of the present application. The non-transitory computer-readable storage medium of the embodiment of the present application stores computer instructions for causing a computer to execute the file directory traversal method provided by the embodiment of the present application.

The memory 602, as a non-transitory computer-readable storage medium, may be configured to store non-transitory software programs, non-transitory computer executable programs and modules, such as program instructions/modules corresponding to the file directory traversal method in the embodiments of the present application (e.g., the current request receiving module 501, the directory calling identifier determining module 502, the directory entry determining module 503, and the directory entry sending module 504 shown in FIG. 6). The processor 601 executes various functional applications and data processing of an electronic device by running the non-transitory software programs, instructions and modules stored in the memory 602, that is, implements the file directory traversal method in the above method embodiments.

The memory 602 may include a program storage area and a data storage area, wherein the program storage area may store an operating system, and an application program required for at least one function; and the data storage area may store data created according to the use of the electronic device. In addition, the memory 602 may include a high speed random access memory, and may also include a non-transitory memory, such as at least one disk storage device, a flash memory device, or other non-transitory solid state storage devices. In some embodiments, the memory 602 may optionally include a memory remotely located with respect to the processor 601, and these remote memories may be connected, via a network, to the electronic device for implementing the file directory traversal method in the embodiment. Examples of such networks may include, but are not limited to, the Internet, an intranet, a local area network, a mobile communication network and combinations thereof.

The electronic device for implementing the file directory traversal method in the embodiment of the present application may further include an input device 603 and an output device 604. The processor 601, the memory 602, the input device 603, and the output device 604 may be connected by a bus or in other ways, and the bus connection is taken as an example in FIG. 7.

The input device 603 may receive input numeric or character information, and generate a key signal input related to a user setting and a function control of an electronic device for implementing the method for map retrieval test. For example, the input device may be a touch screen, a keypad, a mouse, a track pad, a touch pad, a pointer stick, one or more mouse buttons, a track ball, a joystick, and other input devices. The output device 604 may include a display apparatus, an auxiliary lighting device (e.g., a light emitting diode (LED)), a tactile feedback device (e.g., a vibrating motor), etc. The display apparatus may include, but is not limited to, a liquid crystal display (LCD), an LED display, and a plasma display. In some embodiments, the display apparatus may be a touch screen.

Various implementations of the systems and techniques described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

These computing programs (also referred to as programs, software, software applications, or codes) may include machine instructions of a programmable processor, and may be implemented using high-level procedural and/or object-oriented programming languages, and/or assembly/machine languages. As used herein, the terms "machine-readable medium" and "computer-readable medium" may refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

In order to provide an interaction with a user, the system and technology described here may be implemented on a computer having: a display device (e.g., a cathode ray tube (CRT) or a liquid crystal display (LCD) monitor) for displaying information to the user; and a keyboard and a pointing device (e.g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), the Internet and a blockchain network.

The computer system may include a client and a server. The client and the server are typically remote from each other and typically interact via the communication network. The relationship of the client and the server is generated by computer programs running on respective computers and having a client-server relationship with each other.

According to the technical solution of the embodiment of the present application, firstly, the distinguishing of directory traversal requests for different terminals under the same directory is realized by receiving the current directory traversal request of the terminal and determining the directory calling identifier of the terminal; then directory entries meeting the current request of the terminal are sent to the terminal according to the directory calling identifier of the terminal, so that differentiated maintenance and management of the called directory entries of different terminals are realized, and thus the effect of optimizing the directory traversal performance in a file system is achieved.

It should be understood that the steps can be reordered, added or deleted using the various flows illustrated above. For example, the steps described in the present application may be performed concurrently, sequentially or in a different order, so long as the desired results of the technical solutions disclosed in the present application can be achieved, and there is no limitation herein.

The above-described specific embodiments do not limit the scope of the present application. It will be apparent to those skilled in the art that various modifications, combinations, sub-combinations and substitutions are possible, depending on design requirements and other factors. Any modifications, equivalent substitutions, and improvements within the spirit and principles of this application are intended to be included within the scope of this application.

What is claimed is:

1. A file directory traversal method applied in a network file system, comprising:
   receiving, by a server, a first directory traversal request from a terminal for a target directory comprising a plurality of directory entries, wherein the first directory traversal request carries a set mark for indicating that the first directory traversal request is a first request;
   checking, by the server, whether an available directory calling identifier exists under the target directory after receiving the first directory traversal request;
   allocating, by the server, the available directory calling identifier to the terminal in response to determining that the available directory calling identifier exists under the target directory;
   receiving, by the server, a current directory traversal request carrying a directory calling identifier from the terminal for the target directory, wherein the directory calling identifier is the available directory calling identifier sent by the server to the terminal in advance during a valid calling of the terminal to the target directory, and wherein the directory calling identifier is used for representing the terminal under the target directory during the valid calling of the terminal;
   determining, by the server, the directory calling identifier by parsing the current directory traversal request;
   determining, by the server, a directory entry currently requested to be called by the terminal under the target directory, according to the current directory traversal request;
   sending, by the server, the determined directory entry to the terminal in accordance with the directory calling identifier of the terminal; and
   clearing, by the server, a binding relationship between the terminal and the directory calling identifier in a case where a next directory traversal request is not received within a preset time counted from the current directory traversal request, and marking the unbound directory calling identifier as an available state under the target directory for allocating to another terminal when the another terminal sends another first directory traversal request to the server.

2. The file directory traversal method of claim 1, wherein, in a process of determining the directory entry currently requested to be called by the terminal under the target directory, the file directory traversal method further comprises:
   determining a directory entry identifier of the directory entry currently requested to be called by the terminal, wherein the directory entry identifier is used for uniquely representing the directory entry under the target directory; and
   the sending the determined directory entry to the terminal in accordance with the directory calling identifier, comprises:
   sending the determined directory entry and the directory entry identifier of the target entry to the terminal in accordance with the directory calling identifier.

3. The file directory traversal method of claim 2, wherein the directory entry identifier is further used for the terminal to mark a directory entry received successfully in a current directory traversal process; and
   the current directory traversal request comprises a historical directory entry identifier of a last directory entry which has been received successfully by the terminal in a previous directory traversal process for the target directory.

4. The file directory traversal method of claim 3, wherein, the determining the directory entry currently requested to be called by the terminal under the target directory, according to the current directory traversal request, comprises:
   determining a target entry identifier of a first directory entry currently requested to be called by the terminal under the target directory, according to the historical target entry identifier carried in the current directory traversal request; and
   successively determining a preset number of directory entries as the directory entries currently requested to be called by the terminal, based on the target entry identifier of the first directory entry.

5. The file directory traversal method of claim 2, wherein, the sending the determined directory entry and the directory entry identifier of the target entry to the terminal in accordance with the directory calling identifier, comprises:
   generating a calling mark value of the directory entry according to the directory calling identifier and the directory entry identifier of the target entry; wherein, a data format of the calling mark value is related to a file system protocol; and
   sending the determined directory entry and the calling mark value of the target entry to the terminal.

6. The file directory traversal method of claim 1, wherein, the determining the directory entry currently requested to be called by the terminal under the target directory, according to the current directory traversal request, comprises:
   locating a directory pre-fetching cache of the terminal for the target directory, according to the directory calling identifier; and
   extracting, from the directory pre-fetching cache, the directory entry currently requested to be called by the terminal, according to the current directory traversal request.

7. The file directory traversal method of claim 1, wherein, before sending the determined directory entry to the terminal in accordance with the directory calling identifier, the file directory traversal method further comprises:
  determining a number of directory entries sent to the terminal in a current directory traversal process, according to storage space information of the terminal.

8. The file directory traversal method of claim 1, wherein, applicable conditions of the file directory traversal method comprise at least one of:
  in a case where no directory entry modification operation occurs under any directory of a file system in a directory traversal process, relative sorting between respective directory entries under any directory remains unchanged; and
  in a case where a directory entry modification operation occurs under any directory of the file system in a directory traversal process, the relative sorting between directory entries in a directory area that does not involve a modification operation remains unchanged.

9. A file directory traversal apparatus applied in a network file system,
  applied to a server, comprising:
  a processor and a memory for storing one or more computer programs executable by the processor,
  wherein when executing at least one of the computer programs, the processor is configured to perform operations comprising:
  receiving, by a server, a first directory traversal request from a terminal for a target directory comprising a plurality of directory entries, wherein the first directory traversal request carries a set mark for indicating that the first directory traversal request is a first request;
  checking, by the server, whether an available directory calling identifier exists under the target directory after receiving the first directory traversal request;
  allocating, by the server, the available directory calling identifier to the terminal in response to determining that the available directory calling identifier exists under the target directory;
  receiving, by the server, a current directory traversal request carrying a directory calling identifier from the terminal for the target directory; wherein the directory calling identifier is the available directory calling identifier sent by the server to the terminal in advance during a valid calling of the terminal to the target directory, and wherein the directory calling identifier is used for representing the terminal under the target directory during the valid calling of the;
  determining, by the server, the directory calling identifier of the terminal by parsing the current directory traversal request;
  determining, by the server, a directory entry currently requested to be called by the terminal under the target directory, according to the current directory traversal request;
  sending, by the server, the determined directory entry to the terminal in accordance with the directory calling identifier of the terminal; and
  clearing, by the server, a binding relationship between the terminal and the directory calling identifier in a case where a next directory traversal request is not received within a preset time counted from the current directory traversal request, and marking the unbound directory calling identifier as an available state under the target directory for allocating to another terminal when the another terminal sends another first directory traversal request to the server.

10. The file directory traversal apparatus of claim 9, wherein, when executing at least one of the computer programs, the processor is configured to further perform operations comprising:
  determining a directory entry identifier of the directory entry currently requested to be called by the terminal; wherein, the directory entry identifier is used for uniquely representing the directory entry under the target directory; and
  sending the determined directory entry and the directory entry identifier of the target entry to the terminal in accordance with the directory calling identifier.

11. The file directory traversal apparatus of claim 10, wherein the directory entry identifier is further used for the terminal to mark a directory entry received successfully in a current directory traversal process; and
  the current directory traversal request comprises a historical directory entry identifier of a last directory entry which has been received successfully by the terminal in a previous directory traversal process for the target directory.

12. The file directory traversal apparatus of claim 11, wherein, when executing at least one of the computer programs, the processor is configured to further perform operations comprising:
  determining a target entry identifier of a first directory entry currently requested to be called by the terminal under the target directory, according to the historical target entry identifier carried in the current directory traversal request; and
  successively determining a preset number of directory entries as the directory entries currently requested to be called by the terminal, based on the target entry identifier of the first directory entry.

13. The file directory traversal apparatus of claim 10, wherein, when executing at least one of the computer programs, the processor is configured to further perform operations comprising:
  generating a calling mark value of the directory entry according to the directory calling identifier and the directory entry identifier of the target entry, wherein, a data format of the calling mark value is related to a file system protocol; and
  sending the determined directory entry and the calling mark value of the target entry to the terminal.

14. The file directory traversal apparatus of claim 9, wherein, when executing at least one of the computer programs, the processor is configured to further perform operations comprising:
  locating a directory pre-fetching cache of the terminal for the target directory, according to the directory calling identifier; and
  extracting, from the directory pre-fetching cache, the directory entry currently requested to be called by the terminal, according to the current directory traversal request.

15. The file directory traversal apparatus of claim 9, wherein, when executing at least one of the computer programs, the processor is configured to further perform operations comprising:
  determining a number of directory entries sent to the terminal in a current directory traversal process, according to storage space information of the terminal, before the directory entry sending module executes an operation of sending the determined directory entry to the terminal in accordance with the directory calling identifier.

16. The file directory traversal apparatus of claim 9, wherein applicable conditions for running the file directory traversal apparatus comprise at least one of:

in a case where no directory entry modification operation occurs under any directory of a file system in a directory traversal process, relative sorting between respective directory entries under any directory remains unchanged; and in a case where a directory entry modification operation occurs under any directory of the file system in a directory traversal process, the relative sorting between directory entries in a directory area that does not involve a modification operation remains unchanged.

17. A non-transitory computer-readable storage medium storing computer instructions, wherein the computer instructions cause a computer to execute the file directory traversal method comprising:

receiving a first directory traversal request from a terminal for a target directory comprising a plurality of directory entries, wherein, the first directory traversal request carries a set mark for indicating that the first directory traversal request is a first request;

checking whether an available directory calling identifier exists under the target directory after receiving the first directory traversal request;

allocating the available directory calling identifier to the terminal in response to determining that the available directory calling identifier exists under the target directory;

receiving, a current directory traversal request carrying a directory calling identifier from the terminal for the target directory, wherein the directory calling identifier is the available directory calling identifier sent by the server to the terminal in advance during a valid calling of the terminal to the target directory, and wherein the directory calling identifier is used for representing the terminal under the target directory during the valid calling of the terminal;

determining the directory calling identifier by parsing the current directory traversal request;

determining a directory entry currently requested to be called by the terminal under the target directory, according to the current directory traversal request;

sending the determined directory entry to the terminal in accordance with the directory calling identifier of the terminal; and clearing a binding relationship between the terminal and the directory calling identifier in a case where a next directory traversal request is not received within a preset time counted from the current directory traversal request, and marking the unbound directory calling identifier as an available state under the target directory for allocating to another terminal when the another terminal sends another first directory traversal request to the server.

* * * * *